United States Patent [19]

Stewart

[11] 3,901,195

[45] Aug. 26, 1975

[54] LIVESTOCK DUSTING BAG

[76] Inventor: Scott Stewart, c/o Scott Designs, 1800 Commercial Ave., Madison, Wis. 53704

[22] Filed: Apr. 24, 1974

[21] Appl. No.: 463,571

[52] U.S. Cl. ............................... 119/159; 119/159
[51] Int. Cl.² ........................................ A01K 29/00
[58] Field of Search .................... 119/159, 157, 160; 222/189

[56] References Cited
UNITED STATES PATENTS

| | | | |
|---|---|---|---|
| 974,252 | 11/1910 | Fish | 119/159 |
| 2,976,842 | 3/1961 | Hagar | 119/159 |
| 3,777,716 | 12/1973 | Cortner, Jr. | 119/159 |

*Primary Examiner*—J. N. Eskovitz
*Attorney, Agent, or Firm*—Theodore J. Long; John M. Winter; Harry C. Engstrom

[57] ABSTRACT

A weatherproof livestock dusting bag of the type from which insecticidal powder is automatically dispensed onto an animal contacting the bottom of the bag. The bag has a generally conical nylon hood portion, an annular dispensing section of open mesh depending from the hood, and a flexible nylon bottom wall attached to the dispensing section. The bag also incorporates a horn-resistant feature of nylon material with circumferentially spaced grommeted openings extending around the mesh. The bag has a rainskirt extending over and around the dispensing section and also protecting a zippered refill opening. The rainskirt is provided with weighted drapes. A dished shape retaining disc is positioned in the bottom of the bag to maintain the shape of the bag and to provide plunger type agitation and bellows effect for dispensing powder when the bottom of the bag is engaged by an animal thereunder.

9 Claims, 4 Drawing Figures

LIVESTOCK DUSTING BAG

BACKGROUND OF THE INVENTION

This invention relates to livestock dusting bags of the type from which insecticidal, fungicidal, disinfectant or other animal type dusting powder is automatically dispensed onto an animal contacting the bottom of the bag.

As is well known, a variety of vermin including insects such as lice, ticks, flies and the like cause livestock considerable irritation interfering with normal feeding, grazing and resting habits and often resulting in loss of weight, decreased milk production, poor hide quality, infection and other adverse affects which are costly not only to ranchers and dairymen alike, but ultimately to the consuming public.

In the past attempts have been made to individually dust animals by hand, however, this process is too slow, time consuming and expensive to be used successfully with present day herd sizes.

Various forms of suspended automatic livestock dusting devices have been designed. One type of such device takes the form of substantially rigid dispensing cylinder, as shown in U.S. Pat. No. 2,976,842 and having a dispensing section which is unprotected from both rain and butting livestock. This type of dispensing device is therefore particularly subject to clogging due to wetness and clumping of the powder and to being burst and/or ripped open by the cattle sought to be treated. Another form of dispenser, the flexible bag type, is shown in U.S. Pat. No. 3,777,716. As shown therein, the double-bag dispenser appears to provide somewhat better protection from the weather, however it provides little protection from the horns of butting animals. Furthermore, the bag is basically of the bottom dispensing type wherein some or all of the dispensing section directly engages and drags across the hide of the animal thereby picking up moisture, dirt, oil, hair or other foreign material from the animal which tends to clog the dispensing surface.

SUMMARY OF THE INVENTION

I have invented a new and improved cattle dusting bag of simple, yet more efficient and durable design than heretofore known in the art.

My bag has a generally conical waterproof and windproof nylon hood portion, an annular open mesh dispensing section depending from the hood portion, and a nylon bottom wall attached to the dispensing section. The annular dispensing section may incorporate a horn-resistant feature comprising an annular strip of nylon or other dense material having circumferentially spaced grommeted dispensing openings therein encircling the mesh to prevent penetration thereof by the horns of animals.

My bag provides circumferential side dispensing wherein the dispensing section does not engage the animal's hide and is protected from the weather by a circumferential rainskirt so as to minimize clogging problems prevalent in past dispensers. My bag also incorporates weighted drapes depending from the rainskirt to prevent the skirt from being blown up during stormy weather, to attract cattle to use the dispenser and to assist in holding the hood down to maximize the bellows effect when an animal contacts the bottom of the bag.

A dished bottom disc provides shape for the bag, proper weight distribution of the powder, protection for the contents of the bag prevents gravitational loss of powder, and a plunger type bellows effect within the bag itself for dispensing the insecticidal powder through the side openings onto an animal engaging the bottom of the bag.

My bag also has a readily accessible zippered refill opening protected by the rainskirt.

Further objects, features and advantages of my invention will be apparent from the following detailed description taken in conjunction with the accompanying drawings showing a preferred embodiment exemplifying the principles of my invention.

BRIEF DESCRIPTION OF THE DRAWINGS

FIG. 4 is a isometric view of the dished bottom disc which is shown in cross-section in FIG. 2.

DESCRIPTION OF A PREFERRED EMBODIMENT

Figure 1:
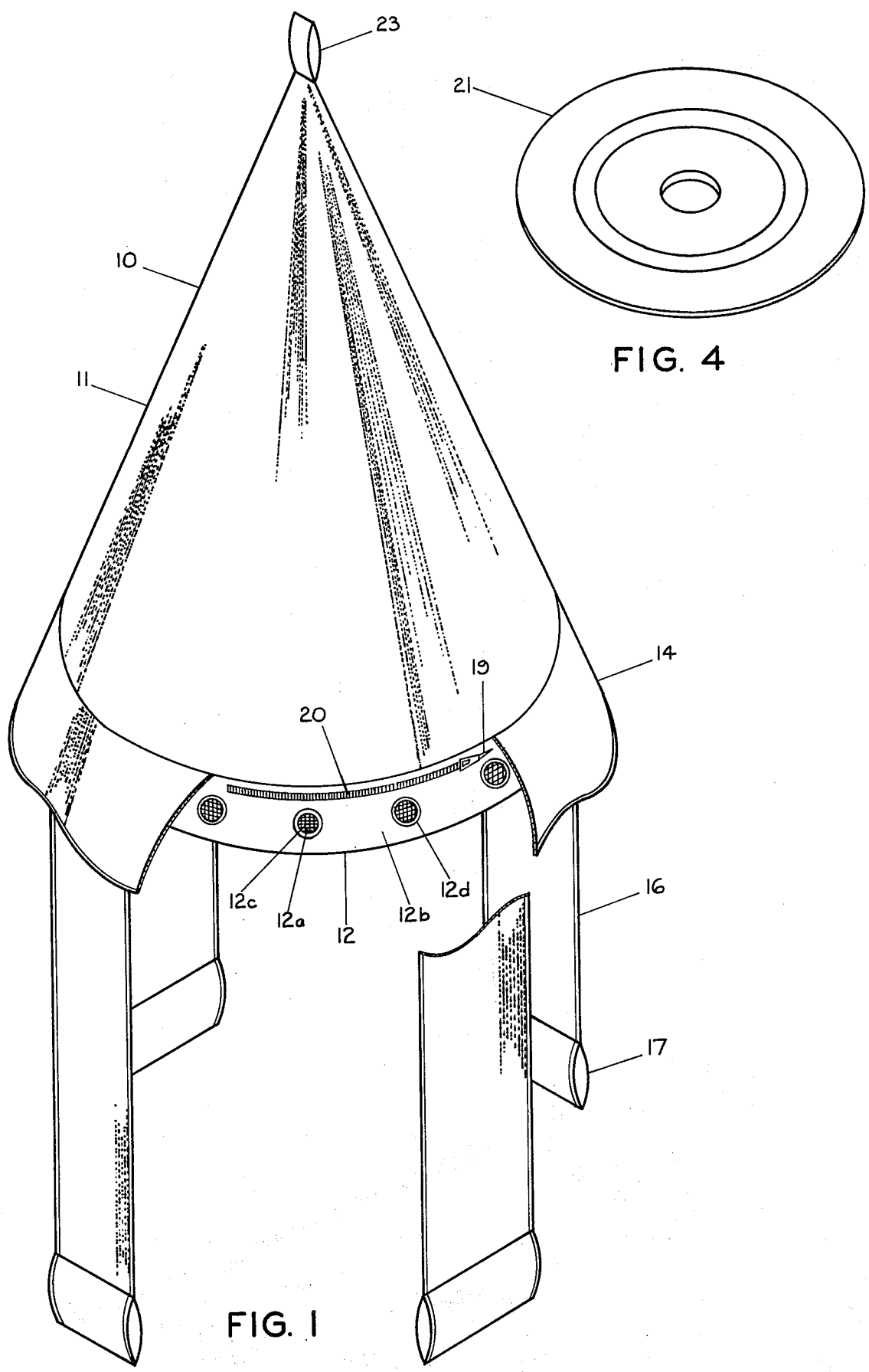
FIG. 1 is an isometric view of my cattle dusting bag with a portion of the rainskirt broken away to show the dispensing section.
Figure 2:
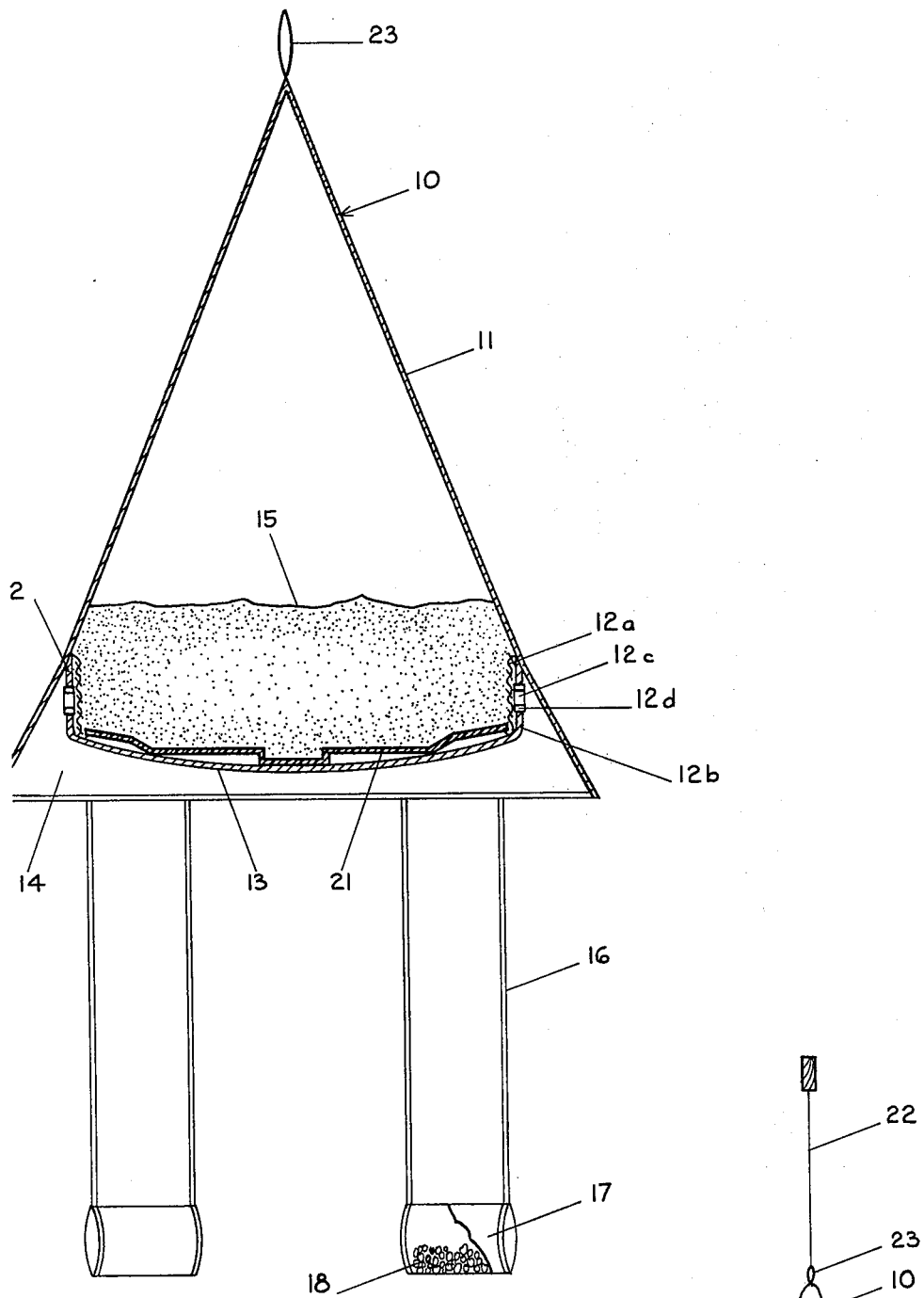
FIG. 2 is a vertical section view of the cattle dusting bag of FIG. 1 with the portion of the pouch of one drape broken away to show the ballast therein.

Referring now more particularly to the drawings wherein like numerals refer to like parts throughout the several views, one embodiment of a cattle dusting bag exemplifying principles of my invention is shown generally at 10 in FIG. 1. As best shown in FIGS. 1 and 2, the bag comprises basically a conical hood 11 of strong waterproof and windproof material such as tightly woven urethane coated nylon. An annular dispensing section 12 includes an open mesh nylon strip 12a and an outer nylon strip 12b sewn completely around the inside circumference of the hood about four-fifths of the distance from the top of the hood. A bottom wall 13 of nylon or other durable material is sewn or otherwise attached around the bottom edge of the annular dispensing section 12. The nylon strip 12b has a plurality of dispensing openings 12c circumferentially spaced therearound designed to prevent horn penetration of the mesh. The openings may be reinforced by metal grommets 12d.

The flow of dusting powder from the bag may be generally controlled within limits by the size and number of dispensing openings provided and the density of the mesh.

Where horning of bags by animals is not likely to be a problem, the protective outer strip 12b may be eliminated whereby the dispensing section will then be comprised of just the nylon mesh strip. The desired flow of powder can be controlled by the density of the mesh, the height of the mesh strip, and by the extent to which the bottom wall 13 extends upwardly above the peripheral edge of the bottom disc 21.

The bag shown has an annular rainskirt 14 of waterproof nylon extending downwardly over the dispensing section and the openings therein. The skirt is preferably an extension of the nylon hood material to provide a continuous layer of waterproof protection for the insecticidal powder shown at 15 in FIG. 2. The nylon bag is rainproof, waterproof, and rotproof.

As seen in FIGS. 1 and 2, a plurality (four shown) of circumferentially spaced nylon drapes 16 depend from the rainskirt. The drapes are preferably about one and one-half feet long and have small pouches 17 formed by sewing at their lower ends. The pouches are filled with ballast such as the pebbles 18 shown in FIG. 3. These drapes perform the multiple functions of holding the rainskirt down so as to prevent exposure of the dispensing section during gusty winds and driving rain conditions attracting livestock to use the bag, and they also serve to hold the hood down to maximize the bellows effect when the bottom of the bag is raised by an animal.

A refill slot 19 adapted to be opened and closed by zipper 20 is formed on one side of the annular dispensing section 12 as shown in FIG. 1 for periodically refilling the bag with insecticidal powder as needed. The rainskirt also protects the refill opening from the weather.

Referring now to FIGS. 2 and 4, a disc 21 of shape-retaining material such as plastic, fiberglas, metal or the like is sewn or otherwise attached in the bottom of the bag. The nylon bottom wall 13 can be eliminated if desired. The disc is moved upward slightly within the bag when the bottom of the bag is jostled or lifted by an animal thereunder to provide a plunger-type bellows effect for dispensing insecticidal powder through the dispensing openings onto the animal. The disc is dished with a concave top surface and convex bottom surface so that the central portion is lower than the outer edge. The concave or dished top surface helps maintain proper distribution of the powder in the bag so that the bag hangs straight, minimizes loss of powder through the dispensing section when the bag is not being contacted by an animal, and also prevents gravitational loss of powder through the bottom of the bag. The convex bottom surface helps in keeping the annular dispensing section at the periphery of the bag out of contact with the hide of the animal when the animal is engaging the bottom of the bag with its back, thus maintaining the dispensing mesh clean and dry to minimize clogging.

Figure 3:
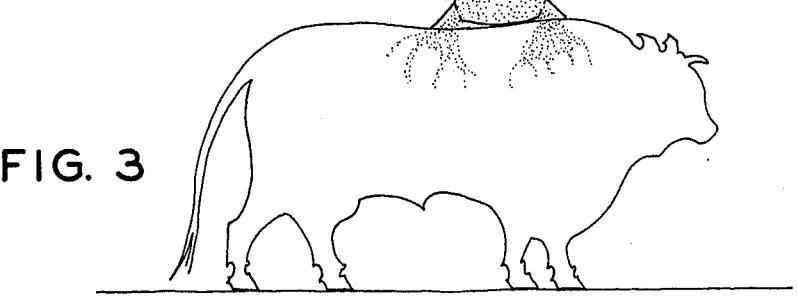
FIG. 3 is a schematic elevation view partly in section showing a suspended cattle dusting bag of the present invention in use dispensing powder on an animal.

FIG. 3 shows the bag 10 suspended from a rope 22 attached to a loop 23 formed at the apex of the conical hood portion. The bag is preferably hung so that the center of the bottom 13 of the bag is about three to six inches below the backline of the animals to be dusted whereby the bottom disc will be jostled or lifted somewhat when engaged by the back of an animal to actuate dispensing of the insecticidal powder.

It should be understood that my invention is not confirmed to the particular construction and arrangement of parts herein illustrated and described, but embraces all such modified forms thereof as come within the scope of the following claims.

1. A cattle dusting bag comprising:
a. a generally conical waterproof hood portion,
b. an annular dispensing section depending from said hood portion, and having dispensing openings therearound,
c. a substantially waterproof depending rainskirt extending over and completely surrounding and protecting the annular dispensing section,
d. a refill opening formed in said bag,
e. means for closing said refill opening, and
f. a shape-retaining bottom disc attached below said dispensing openings for movement upwardly slightly within the bag when the bottom of the bag is engaged by an animal for dispensing dusting powder from the bag onto the animal.

2. The cattle dusting bag as specified in claim 1 having a flexible bottom wall attached to said annular dispensing section and extending under said bottom disc and upwardly about the periphery of said disc.

3. The cattle dusting bag as specified in claim 1 wherein said annular dispensing section and openings therein comprise a flexible mesh material through which the dusting powder will pass on being agitated.

4. The cattle dusting bag as specified in claim 1 incorporating a horn-resistant feature wherein the annular dispensing section comprises a strip of durable material impervious to the dusting powder and a series of circumferentially spaced dispensing openings therein, and a strip of flexible mesh material extending across said openings and through which the dusting powder will pass on being agitated.

5. The cattle dusting bag as specified in claim 1 comprising a plurality of circumferentially spaced flexible weighted drapes depending from said rainskirt.

6. The cattle dusting bag as specified in claim 1 wherein said disc has a generally concave top surface.

7. The cattle dusting bag as specified in claim 1 wherein said disc has a generally convex bottom surface.

8. The cattle dusting bag as specified in claim 1 wherein said disc has a generally concave top surface and a generally convex bottom surface.

9. A cattle dusting bag comprising:
a. a waterproof hood portion for receiving dusting powder;
b. a strip of flexible mesh material attached to said hood portion and through which the dusting powder will pass on being agitated;
c. a strip of durable flexible material attached to said hood portion over said strip of flexible mesh material and having a series of spaced dispensing openings therein; and
d. shape-retaining grommets encircling said dispensing openings and attached to said durable material.

* * * * *